(12) United States Patent
Stahl

(10) Patent No.: US 8,121,545 B2
(45) Date of Patent: Feb. 21, 2012

(54) WIRELESS NETWORK AWARENESS IN APPLIANCES

(75) Inventor: Michael M. Stahl, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 1002 days.

(21) Appl. No.: 11/957,452

(22) Filed: Dec. 15, 2007

(65) Prior Publication Data

US 2009/0156121 A1 Jun. 18, 2009

(51) Int. Cl.
*H04B 7/00* (2006.01)

(52) U.S. Cl. .................. 455/41.2; 455/3.05; 455/426.1; 455/501; 455/570; 455/557; 709/227; 370/338; 370/445

(58) Field of Classification Search .............. 455/41.2, 455/3.05, 426.1, 557, 570, 500, 501; 709/227, 709/250; 370/338, 352, 445
See application file for complete search history.

(56) References Cited

U.S. PATENT DOCUMENTS

| | | | |
|---|---|---|---|
| 6,498,939 B1 * | 12/2002 | Thomas ..................... | 455/562.1 |
| 6,754,872 B2 * | 6/2004 | Zhang et al. ................ | 714/786 |
| 6,930,598 B2 * | 8/2005 | Weiss ........................... | 340/531 |
| 7,146,133 B2 * | 12/2006 | Bahl et al. .................... | 455/63.1 |
| 7,460,837 B2 * | 12/2008 | Diener ......................... | 455/67.7 |
| 7,526,312 B2 * | 4/2009 | Martin ......................... | 455/552.1 |
| 7,610,057 B2 * | 10/2009 | Bahl et al. .................... | 455/522 |
| 2002/0183067 A1 * | 12/2002 | Airy et al. .................... | 455/455 |
| 2005/0239497 A1 * | 10/2005 | Bahl et al. .................. | 455/552.1 |
| 2005/0286466 A1 * | 12/2005 | Tagg et al. .................... | 370/329 |
| 2008/0144550 A1 * | 6/2008 | Makhlouf et al. ............ | 370/310 |

OTHER PUBLICATIONS

Guoqing C. Li, et al., U.S. Appl. No. 11/772,141, filed Jun. 30, 2007, entitled Contention Window Adaptation of Wireless Devices for Mitigation of Periodic Interference.

* cited by examiner

*Primary Examiner* — Marceau Milord
(74) *Attorney, Agent, or Firm* — Kacvinsky Daisak, PLLC

(57) ABSTRACT

A household appliance, such as a microwave oven or cordless phone, reduces interference with a wireless network by requesting control of the network's channel during a period of time when the appliance will be emitting signals that may interfere with network communications on that channel. Some embodiments contend for the channel before transmitting the request by using standard protocols, while other embodiments simply transmit the request during a detected idle period. Some embodiments don't bother sending a request if no activity is detected on the channel.

25 Claims, 4 Drawing Sheets

WIRELESS NETWORK AWARENESS IN APPLIANCES

BACKGROUND

Many wireless communications devices, especially those developed to operate under the guidelines of IEEE standard 802.11, use the same frequency band(s) that are used by other communications devices (e.g., Bluetooth devices, cordless telephones, etc.) and common appliances such as microwave ovens (although conventional microwave ovens don't communicate wirelessly, their magnetrons emit radio frequency signals in the same frequency band). Since these devices are not designed to cooperatively share the frequency spectrum with 802.11-compliant networks, they may emit radio frequency signals at any time and interfere with the operation of such a network. The resulting interference can disrupt communications. As wireless communications devices in the home and workplace become more common, the incidence of this interference is expected to increase. As time-critical wireless transmissions such as video streaming become more common, the effect of this interference may become more disruptive.

BRIEF DESCRIPTION OF THE DRAWINGS

Some embodiments of the invention may be understood by referring to the following description and accompanying drawings that are used to illustrate embodiments of the invention. In the drawings.

DETAILED DESCRIPTION

Figure 1:
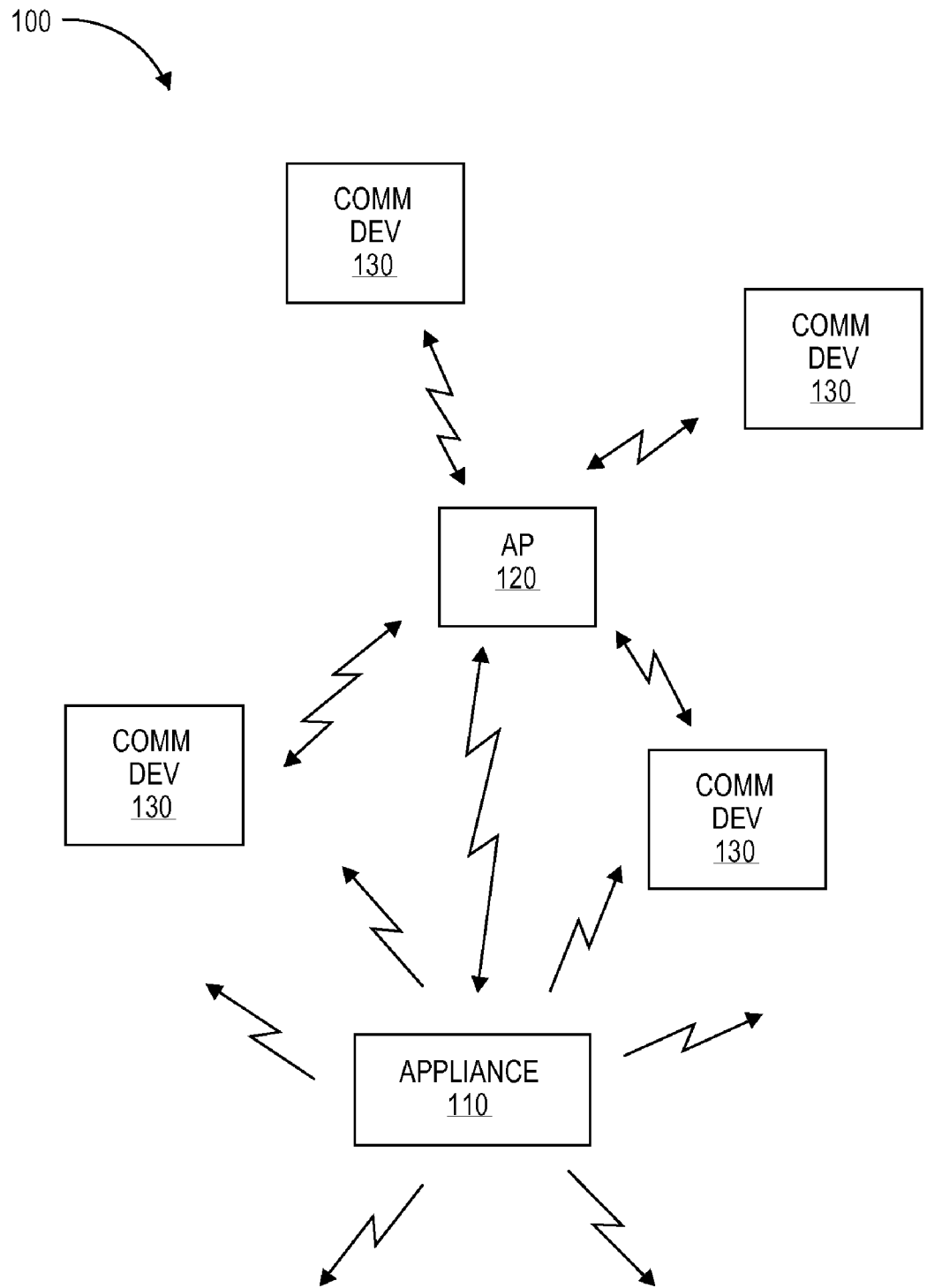
FIG. 1 shows an appliance within range of a wireless network, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a machine-readable medium, which may be read and executed by one or more processors to enable performance of the operations described herein. A machine-readable medium may include any mechanism for storing, transmitting, and/or receiving information in a form readable by a machine (e.g., a computer). For example, a machine-readable medium may include a tangible storage medium, such as but not limited to read only memory (ROM); random access memory (RAM); magnetic disk storage media; optical storage media; a flash memory device, etc. A machine-readable medium may also include a propagated signal which has been modulated to encode the instructions, such as but not limited to electromagnetic, optical, or acoustical carrier wave signals.

The term "wireless" and its derivatives may be used to describe circuits, devices, systems, methods, techniques, communications channels, etc., that communicate data by using modulated electromagnetic radiation through a non-solid medium. The term does not imply that the associated devices do not contain any wires, although in some embodiments they might not. The term "mobile wireless device" is used to describe a wireless device that may be in motion while it is communicating.

In various embodiments of the invention, an appliance may coordinate with wireless communications devices, to warn those communications devices when a wireless emission is to take place at a frequency used by the wireless communications devices. Being thus warned, the wireless communications devices may then refrain from trying to communicate during that time. In some embodiments, the appliance may use standard communications protocols to reserve that time period for its use of the channel, even though it might not actually use the channel for communications during that period.

FIG. 1 shows an appliance within range of a wireless network, according to an embodiment of the invention. In wireless communications network 100, an access point (AP) 120 may have two-way wireless communication with a number of wireless communications devices 130 (e.g., mobile stations). In some embodiments, these wireless communications devices may conform to the requirements of a communications standards, such as the Institute of Electrical and Electronic Engineers (IEEE) standard 802.11, including its derivative standards (IEEE 802.11a, 802.11b, 802.11g, etc.).

An appliance 110 is shown that emits radio frequency (RF) signals which could interfere with the communications between the AP 120 and at least one of the communications devices 130. The term 'appliance', as used herein, is intended to encompass any device that emits RF signals that are not designed to communicate within the affected wireless network, but are close enough that their RF signals may interfere with communications within that network. In various embodiments, these RF emissions may or may not be designed to communicate with other devices not in the network. Some examples are given here, but this list is not intended to be limiting. For example, in some embodiments appliance 110 may be either the handset or base set of a cordless telephone, with the two parts of the cordless phone communicating with each other over a channel that uses the same frequency as is used by the network 100. In other embodiments, appliance 110 may be a microwave oven. Although the magnetron of a microwave oven is not a communications device, its operation can emit RF signals of the same frequency as is used by the network 100. Another example might be a Bluetooth device. Other embodiments may include appliances of other types. The location of the appliance 110 may be close enough to the AP 120 and/or at least one communications device 130, and the strength of the emitted signals from the appliance 110 may be strong enough, that the operation of the appliance 110 will interfere with the reception of signals by either the AP 120 and/or at least one of the devices 130. By establishing communications with the AP 120 and/or other devices in the network 100, using network protocols that are recognized by the network devices, the appliance may get the network devices to stop their communications while the appliance is emitting signals, thereby reducing or eliminating uncontrolled interference between the appliance and the network devices.

Figure 2:
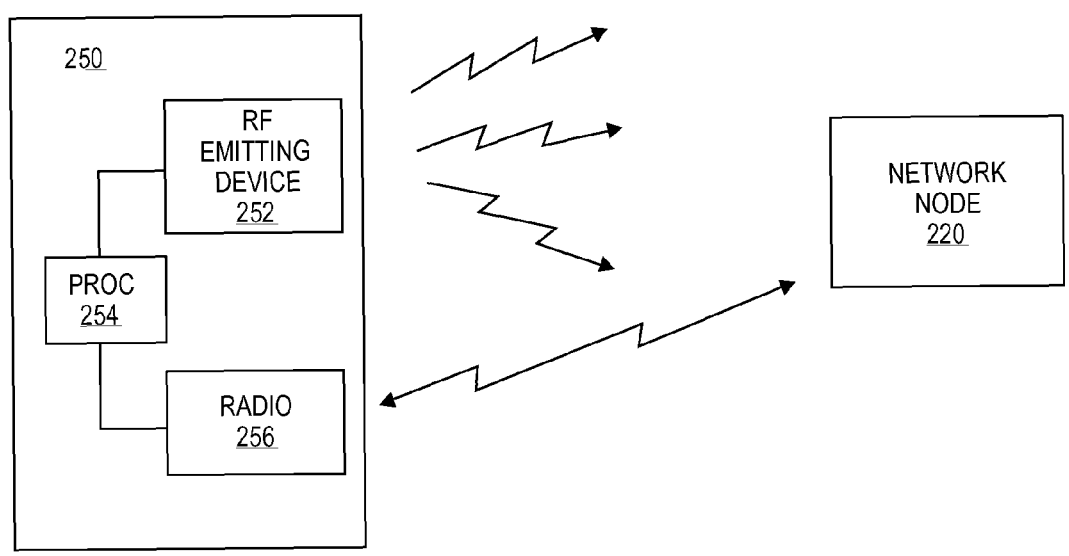
FIG. 2 shows an appliance and a network node, according to an embodiment of the invention.

FIG. 2 shows an appliance and a network node, according to an embodiment of the invention. Network node 220 may be a wireless communications device operating in a wireless communications network, such as but not limited to an access point, a base station, a mobile communications device, etc. Appliance 250 may be any appliance that emits RF signals on the same frequency as that used by the network for communications. RF emitting device 252 is the element that emits these RF signals, which are described later in more detail. Radio 256 may be used for communication with the network node 220, and may use communications protocols for this purpose that have been established for the network. A processor 254 is also shown coupled between the radio 256 and the RF emitting device 252, although some embodiments may use a simpler logic device than a processor. Although the emitting device, radio, and processor are shown as separate entities, their functionality may be integrated together in any feasible manner.

One example of such an appliance is a microwave oven, which typically emits RF radiation in a band that covers a frequency of approximately 2.4 GHz, the same frequency used by many wireless networks for communications. This radiation may come primarily from the magnetron in the microwave oven, and the frequency is chosen because of the heating effect it has on water molecules. Although this emission is not designed for communication, it may interfere with devices that use the same frequency for communication, such as network node 220.

Another example of such an appliance is a cordless telephone, in which the hand set and the desk set parts of the telephone communicate with each other wirelessly over short distances instead of communicating through a wire cable, as was done with older telephones. Many cordless telephones use the 2.4 GHz frequency for this communication, and this communication may therefore also interfere with nearby wireless networks. Since most cordless phones are not designed to communicate with other wireless networks, such communication can also act as a source of interference for the network. This interference may be most noticeable in home or office environments, in which appliances and multiple wireless devices may be located in close proximity to each other, so that their signals may still be strong enough to interfere with each other.

In operation, the RF emitting device may emit the interfering radiation as a function of its normal operation. Such devices are typically not intelligent enough to alter their operation to avoid interfering with other devices. However, such radiation is typically emitted in an intermittent manner. For example, the magnetron of some microwave ovens may operate in 16 millisecond (ms) cycles, by emitting radiation for 6 ms and not emitting for 10 ms in each cycle. Similarly, a cordless phone may transmit only in short bursts, with periods of silence between those bursts. In either case, the timing of the emissions may be predictable within the appliance.

Processor 254 may be coupled to the RF emitting device 252 in such a way as to be aware of when the next emission is to occur. As the time for that emission approaches, the processor 254 may cause the radio 256 to communicate with the network node in such a manner that the network node (and possible other network nodes) will not attempt any network communications during this period of emission. In some embodiments, the communication between the radio 256 and the network node 220 (and/or other network nodes) may be two-way communication.

Figure 3:
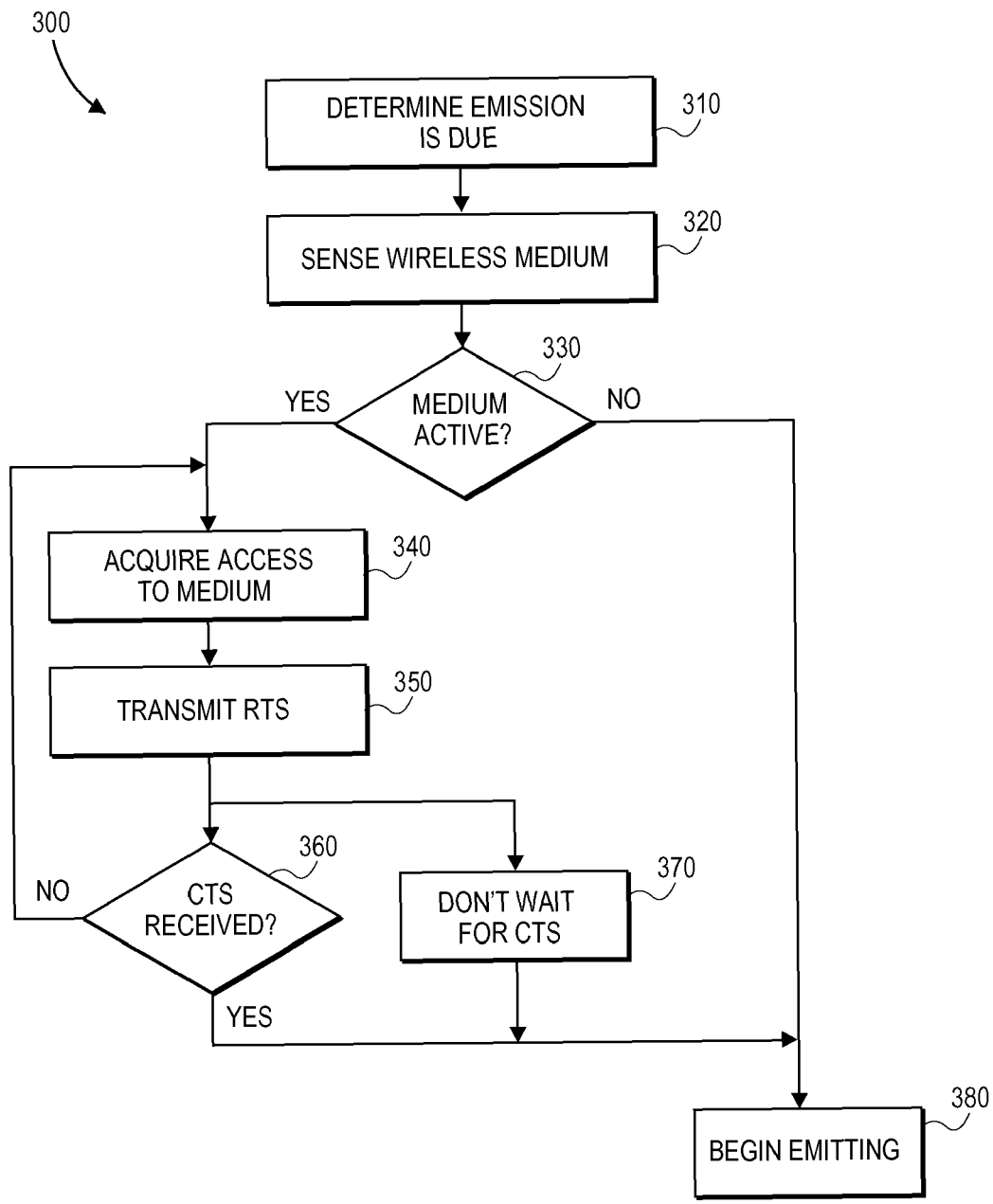
FIG. 3 shows a flow diagram of a method of communicating with a network node, according to an embodiment of the invention.

FIG. 3 shows a flow diagram of a method of communicating with a network node, according to an embodiment of the invention. These operations are carried out within the appliance. In flow diagram 300, at 310 it is determined that an emission of RF radiation is due soon. In some embodiments the amount of lead time needed to trigger this determination may vary, depending on the type of appliance, the cycle time of the emission, the amount of congestion on the network, etc. After such a determination is made, the wireless medium may be sensed at 320 to determine if the communications channel is being used. In some embodiments, this may simply detect whether there is a carrier wave operating on that frequency, even if it is not being modulated to carry data. If no signal is detected at 330 (e.g., if there are no network devices operating within detectable range), then the appliance may simply begin emitting on schedule at 380 without further interaction with other devices.

However if it appears at 330 that there is possible network traffic, at 340 the processor and radio in the appliance may try to acquire the right to use the communications channel during the anticipated period of emission. Acquiring this right may involve generating a request to use the channel during a certain period of time (the time the emission will be taking place), and transmitting that request to a centralized network controller (e.g., an access point, a base station, etc.), such as network node 220 in FIG. 2. However, the radio will first need to acquire the channel just to transmit the request. This may be accomplished in various ways, depending on the protocols of the particular network.

In one commonly known contention-based approach, the radio may wait for a period of silence on the channel, assume such silence indicates the channel is not being used, and then transmit the request. However, if another device goes through the same process and tries to transmit at the same time, the resulting collision in signals may prevent the request from being received by the network controller. In case of collision, both transmitting devices may try again, possibly after a randomly-selected delay (although the appliance might retry immediately to get an advantage in acquiring the channel). In another approach, using a more controlled process, the radio may already be registered as a network node, and may transmit the request at a time previously designated by the network controller.

In still another approach, the radio may start transmitting the request during an interframe space (IFS) period. An IFS is a short period of time between scheduled transmissions, during which no network device is scheduled to transmit. This is typically used as a 'pad' to allow for differences in timing between different network devices, or to allow network devices to transition their internal circuitry between transmit and receive modes. Deliberately starting to transmit during the IFS may violate some network protocols established for controlled network communications by 'stealing' access to the channel. In some types of networks this approach might cause collisions and should not be used. In some other types of networks it may be a feasible, if unorthodox, manner of operating.

Regardless of the approach used to gain control of the channel at 340, the request may be transmitted at 350. In the illustrated example, a request-to-send (RTS) frame is transmitted. This frame may contain not only a request to use the channel, but also a requested time period (e.g., start time and duration) for that usage. In some embodiments the radio will then wait to receive a clear-to-send (CTS) frame from the network controller at 360, granting it the right to use the channel during the requested time period. If the CTS is received, the appliance may then begin emitting at its scheduled time at 380, with the assurance that it is not interfering with network devices because it has been granted the use of the channel during that time period. Although it may not be transmitting anything that the various network devices can use, at least those other devices won't be trying (and failing) to communicate during that period. If the CTS is not received within a designated time period as indicated at 360 (either because no response was received, or because the request was denied), then the flow may return to 340 to try again.

In some embodiments, the radio may be designed to emit without waiting for a CTS at 370. Although this approach may violate some of the network protocols established for controlled communication within the network, it may still permit the appliance to communicate its intended emission time to the network, so that there will be some chance that the other devices in the network will not try to start transmitting at the beginning of the period of emission. While not a perfect solution, this may still be better than the conventional network approach of always treating the emissions as an unknown and unanticipated source of interference.

Figure 4:
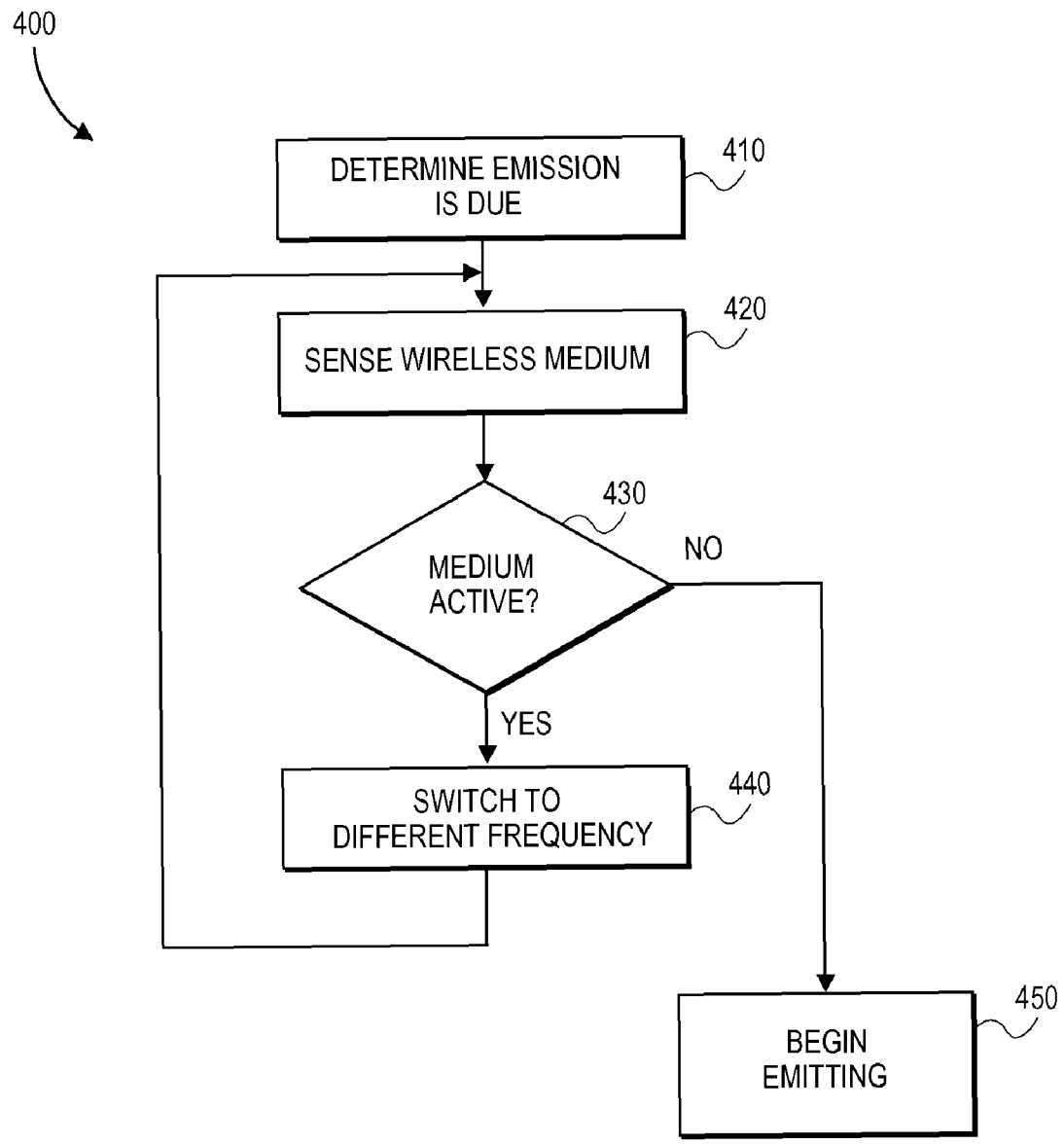
FIG. 4 shows a flow diagram of another method of communicating with a network node, according to an embodiment of the invention.

FIG. 4 shows a flow diagram of another method of communicating with a network node, according to an embodiment of the invention. Unlike the method of FIG. 3, in the method of flow diagram 400 the appliance may try to avoid interference with network devices by switching its emissions to a different frequency. At 410 the appliance determines that an emission is due to be generated during a specified time period. In anticipation of that time period, the wireless medium is sensed at 420 to determine if the channel is active. If the channel is not active (e.g., if no carrier is sensed) as determined at 430, then the emissions may begin on schedule at 450 with no further considerations. However, if it appears the channel is active, the appliance may make some internal changes so that the emissions will occur on a different frequency that won't interfere with this channel. Accordingly, at 440 a different frequency (channel) is selected, and the process at 420-450 is repeated for this new frequency until a suitable channel is found. This approach may not be suitable for some microwave ovens, since the frequency of their emissions is chosen based on its ability to impart energy to water molecules. However, it could be used in cordless phones that can operate over any of multiple channels. In a similar approach, in some embodiments the appliance may send a request to the network that the network switch frequencies to avoid the interferences, rather than the appliance changing frequencies.

In some appliances, the emissions occur at regular, unchangeable intervals (e.g., microwave ovens may emit based on cycles of the AC voltage source). In such environments, it may not be possible to avoid interference if the network is not notified in time (as in the case of FIG. 3) or a suitable channel is not found in time (as in the case of FIG. 4). This disadvantage may be mitigated by starting the process further in advance of the anticipated emission period. In some embodiments, just how far in advance of the emission period may be dynamically changed, based on how often the process succeeds or fails to avoid probably interference.

The foregoing description is intended to be illustrative and not limiting. Variations will occur to those of skill in the art. Those variations are intended to be included in the various embodiments of the invention, which are limited only by the spirit and scope of the following claims.

What is claimed is:

1. An apparatus, comprising
an appliance comprising:
a first device for emitting radio frequency (RF) signals at a particular time and at a frequency used by a particular wireless channel; and
a second device, coupled to the first device, for wirelessly transmitting and receiving data within a network on the particular wireless channel;
wherein the second device is to transmit particular data to a network node, requesting use of the particular wireless channel at the particular time;
wherein the first device emits RF signals that are not designed to communicate within the network to which the second device wirelessly transmits and receives data; and
wherein the first device is unable to alter the particular time and frequency to avoid causing interference on the wireless channel.

2. The apparatus of claim 1, wherein the particular data is further to request the network node to refrain from transmitting during the particular time.

3. The apparatus of claim 2, wherein the second device is further to receive a response to the request.

4. The apparatus of claim 3, wherein the request is a request-to-send (RTS) and the response is a clear-to-send (CTS).

5. The apparatus of claim 1, wherein the apparatus is a microwave oven.

6. The apparatus of claim 1, wherein the apparatus is a cordless telephone.

7. The apparatus of claim 1, wherein the second device is to contend for access to the channel, prior to transmitting the particular data, using communication protocols established for the network.

8. The apparatus of claim 1, wherein the second device is to begin transmitting the particular data during an interframe space (IFS) in communication protocols established for the network.

9. The apparatus of claim 1, wherein the second device is to begin transmitting the particular data during a time when no carrier is sensed on the channel.

10. The apparatus of claim 1, wherein the first device is to emit the RF signals at regular intervals.

11. A method, comprising:
determining that a first radio frequency (RF) signal is due to be emitted from an appliance during a particular time interval; and
wirelessly transmitting a request from the appliance to a network node operating in a wireless communication network to use a wireless channel during the particular time interval, the wireless channel using a same frequency as at least part of the first RF signal;

wherein the emitted first RF signal from the appliance is not designed to communicate within the wireless communication network to which the appliance transmits the request; and wherein the appliance is unable to alter the time interval.

12. The method of claim 11, wherein the appliance is a microwave oven and the first RF signal is emitted from a magnetron in the microwave oven.

13. The method of claim 11, wherein the appliance is a cordless telephone and the first RF signal is a communication between a handset and a deskset of the cordless telephone.

14. The method of claim 11, wherein said transmitting the request comprises transmitting a request-to-send (RTS).

15. The method of claim 11, further comprising receiving a response to the request.

16. The method of claim 15, wherein said receiving comprises receiving a clear-to-send (CTS).

17. The method of claim 11, wherein said transmitting includes transmitting a request that at least one network device switch to another channel.

18. The method of claim 11, further comprising:
determining the channel is active prior to said transmitting; and
switching to a different channel before transmitting the request, resultant to said determining the channel is active.

19. An article comprising
a tangible non-transitory machine-readable medium that contains instructions, which when executed by one or more processors result in performing operations comprising:
determining that a first radio frequency (RF) signal is due to be emitted from an appliance during a particular time interval; and
wirelessly transmitting a request from the appliance to a network node operating in a wireless communication network to use a wireless channel during the particular time interval, the wireless channel using a same frequency as at least part of the first RF signal;
wherein the emitted first RF signal from the appliance is not designed to communicate within the wireless communication network to which the appliance transmits the request; and
wherein the appliance is unable to alter the time interval.

20. The article of claim 19, wherein the appliance is a microwave oven.

21. The article of claim 19, wherein the appliance is a cordless telephone and the first RF signal is a communication between a handset and a deskset of the cordless telephone.

22. The article of claim 19, wherein the operation of transmitting the request comprises transmitting a request-to-send (RTS).

23. The article of claim 19, further comprising an operation of receiving a response to the request.

24. The article of claim 23, wherein the operation of receiving comprises receiving a clear-to-send (CTS).

25. The article of claim 19, wherein the operations further comprise:
determining the channel is active prior to said transmitting; and
switching to a different channel before transmitting the request, resultant to said determining the channel is active.

* * * * *